Patented Dec. 1, 1936

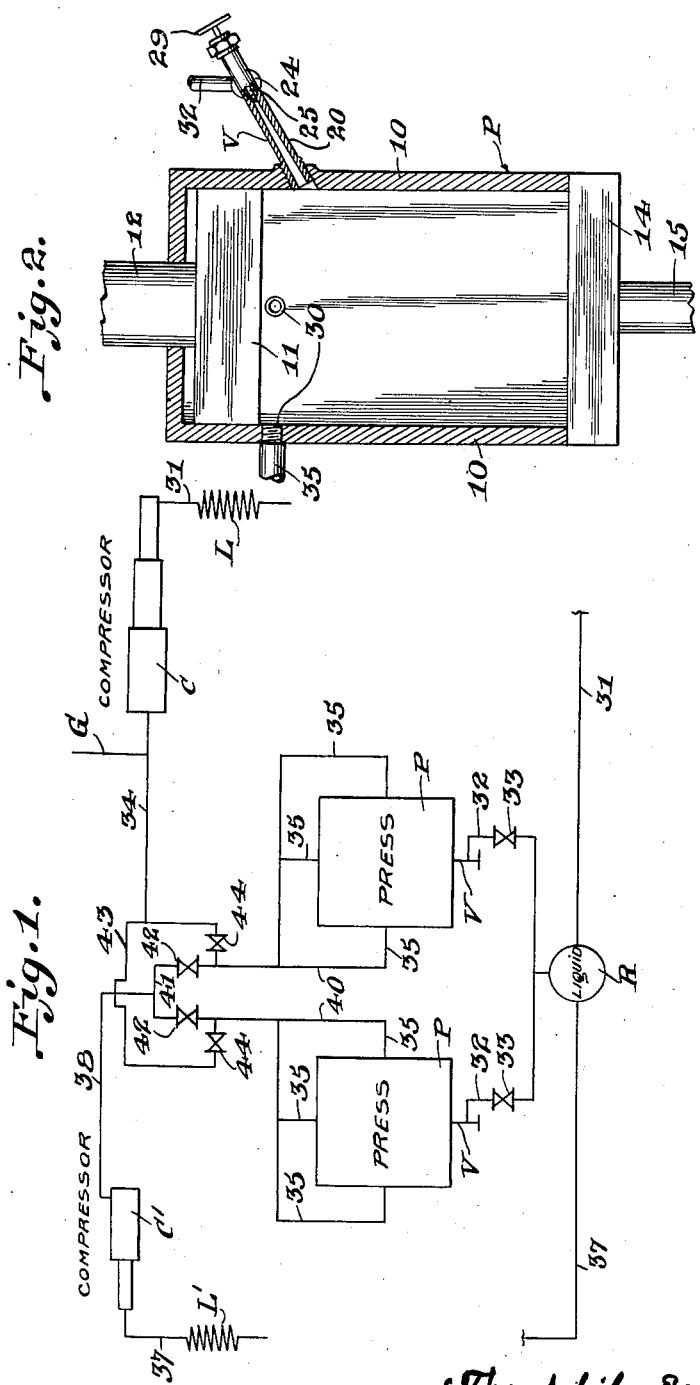

2,062,971

UNITED STATES PATENT OFFICE 2,062,971

APPARATUS FOR SOLIDIFYING CARBON DIOXIDE

Theophil Eichmann, Bern-Liebefeld, Switzerland, assignor to International Carbonic Engineering Company, Kennett Square, Pa., a corporation of Delaware Original application May 16, 1932, Serial No. 611,741. Divided and this application December 9, 1933, Serial No. 701,702. In Switzerland October 8, 1932

8 Claims. (Cl. 62—121)

This invention relates to certain improvements in apparatus for solidifying carbon dioxide; and the nature and objects of the invention will be clearly recognized and understood by those skilled in the art in the light of the following explanation and detailed description of the accompanying drawing illustrating what I at present consider to be the preferred embodiments or mechanical expressions of my invention from among various other forms, arrangements, combinations and constructions, of which the invention is capable within the spirit and scope thereof.

This application is a division of my pending United States patent application filed May 16, 1932, Serial No. 611,741, which has matured into U. S. Patent No. 1,969,169, for Method of and apparatus for solidifying carbon dioxide; and discloses an invention that has as a general object the provision of an arrangement and installation of apparatus to form a carbon dioxide solidifying plant that is capable of operation to substantially continuously produce solid carbon dioxide.

The arrangement of apparatus forming a solidifying plant embodying my present invention is featured and characterized by the use of a plurality of carbon dioxide solidifiers arranged in groups and so operatively associated with each other and with carbon dioxide liquefying compressors and auxiliary apparatus, that it is possible in operation of the plant to always have one group of solidifiers completing and discharging solid carbon dioxide while another group or groups are forming and charging with solid, preparatory to completion and discharge thereof when the previously discharging group has been emptied and is ready for further solidification therein. The operation of the solidifier groups is thus substantially alternate or successive so that the result from an apparatus arrangement forming a solidifying plant of my invention is to practically continuously produce solid carbon dioxide therefrom without substantial or appreciable time consuming delays or interruptions in production.

A further general object and a feature of my invention is the provision of the arrangement of the solidifiers or groups thereof and of the liquid carbon dioxide supply lines and carbon dioxide gas offtake lines in relation with the liquifying compression means so that the solidifiers are operated in association with a common compression means as a unit solidifying plant; and in the relation and association of the various apparatus in a manner making for ease of control and to carry out the general objects and obtain the results of the invention in a practical and efficient manner.

With the foregoing general objects and results in view, as well as certain others that will be recognized from the following explanation, the invention consists in certain novel features in construction and in arrangements and combinations of elements and apparatus, all as will be more fully and particularly referred to and specified hereinafter.

Referring to the accompanying drawing, Fig. 1 is a purely diagrammatic view of an arrangement of a plurality of presses and associated apparatus making up a continuously operating plant installation in accordance with my invention.

Fig. 2 is a purely diagrammatic view of one of the solidifiers or presses that may be utilized in the apparatus of Fig. 1, such press being partially diagrammatically shown in vertical transverse section.

In my pending United States application filed May 16, 1932, Serial Number 611,741, of which this application is a division, I have disclosed and claimed a method of solidifying and forming blocks of solid carbon dioxide, and for purposes of explanation and as an example, I have in the present application, disclosed an apparatus forming a continuous production solidifying plant that is adapted to operation in accordance with the method of the above identified application. However, the broad invention of the present application, as exemplified by the arrangement of apparatus shown, is not specifically limited or restricted to carry out the exact solidification method of my prior application, but can be operated to carry out other methods or can be embodied in and expressed by other apparatus for carrying out other solidification methods that are not within the capabilities of the exact form of apparatus of the present example, in order to form a substantially continuous production solidification plant in accordance with the broad scope of my present invention.

Purely as an example, and not as a limitation, I have selected a type of carbon dioxide solidifier in the form of a hydraulic or mechanically operated press, that is more or less familiar to those skilled in the art, for pressing solid carbon dioxide into blocks or cakes, the solid carbon dioxide being formed within the press chamber for pressing by the press piston or plunger into blocks or cakes. The invention contemplates and includes within its scope and as broadly equivalent to the press type of solidifier, any other desired forms or types of solidifiers, and is not limited or restricted to a press or mechanical pressure type solidifier of the instant example, as will be readily apparent to those skilled in this art.

In Fig. 1 of the accompanying drawing, I have purely diagrammatically shown an arrangement and layout of apparatus forming an example of a continuous production solidification plant of my invention. In this plant arrangement, a plurality of carbon dioxide solidifiers P is provided that are divided or formed into groups. In the present example, I have shown but two solidifiers P and it is to be understood that each one of them represents a group that may include one or any desired number of such solidifiers. The plant also includes a carbon dioxide liquid receiver R that supplies liquid carbon dioxide to the solidifiers P for conversion into the solid form and carbon dioxide liquefying means is provided for supplying liquid carbon dioxide to the receiver R. Such liquefying means in the particular form of the apparatus here disclosed, includes a multi-stage, say three-stage, main liquefying compressor C, and a compressor C' that in this instance happens to be of the two-stage type. This compression means consisting of the compressors C and C' withdraws the gases from the solidifiers that result from the solidification operations therein and suitably recompresses such gases for liquefaction and return back to the liquid receiver R. Attention is directed to the fact that while separate multi-stage compressors C and C' are shown in the present arrangement of the apparatus, my invention is not limited in all respects to the use of separate compressors, as a single or unit multi-stage compressing means may be employed as the equivalent broadly of such separate compressors.

The solidifiers P are, in the present example, of the press type for pressing the solid carbon dioxide formed therein into high density blocks or cakes, and the general arrangement of these press type solidifiers is more or less diagrammatically shown in Fig. 2 of the drawing, to which reference is now made. Each press solidifier P provides a press chamber that is formed by the vertical walls 10 and the upper end of the press chamber is closed by the vertically reciprocal plunger or piston 11 that slidably fits and is received in the chamber by the press chamber walls 10. The plunger of piston 11 is provided with the usual outwardly extended piston rod 12 that is associated with the usual hydraulic or other suitable plunger actuating mechanism familiar in the art (not shown). The lower end of the press chamber is closed and sealed by a vertically movable plate or platform 14 that is carried on the upper end of an actuating rod or column 15, that is also actuated by any suitable hydraulic or other mechanism of any of the usual types (not shown), for the purpose of raising and lowering the platform 14 to and from press chamber sealing and closing position. When the platform 14 is in its raised position, closing the lower end of the press chamber, it bears against and forms a sealing fit with the lower ends of the press walls 10. The arrangement of the platform 14 and its actuating means is such that the platform is held in closed position against pressures generated within the press chamber, as well as against the pressures exerted by piston 11 during a pressing operation. Upon completion of a pressing operation and the formation of a block or cake of solid carbon dioxide in the press chamber, the platform 14 is lowered to open the press chamber and for removal of the block of solid carbon dioxide from the press.

Each solidifier or press P is provided with a valve and discharge nozzle unit V, mounted in and extending through a press chamber side wall 10 adjacent the upper end thereof for discharging into the upper end portion of the press chamber at a point below the normal, raised and inactive position of the press plunger 11. This unit V may, as in the example shown, embody an elongated body member 20 having the axial nozzle forming conical bore 21 extending from its discharge end inwardly to a needle valve 25 that through a hand wheel 29 controls the flow of liquid carbon dioxide into the nozzle bore from a suitable liquid supply line 32. Liquid carbon dioxide is supplied to the nozzle unit V and expanded therein through the valve 25 to pressure at which solid carbon dioxide is produced in the form of crystals or snow which are then discharged by the nozzle into press chamber where they are collected.

At the upper end portion of the press chamber, and in proximity to but below the normal raised and inactive position of a press plunger 11, there is provided a series or plurality of carbon dioxide gas ports 30, one in each of the press walls 10 with the exception of that wall 10 in which the valve and nozzle unit is mounted. These ports 30 are for the purpose of withdrawing carbon dioxide gas from the press chamber as this gas is formed during the expansion of the liquid carbon dioxide and the resulting discharge of carbon dioxide snow and gases into the press chamber.

Solid carbon dioxide can be formed in accordance with a variety of different methods in the press P, but for purposes of explanation and as a specific example, the method of my above identified pending U. S. patent application is followed in operating the presses P. In accordance with such method, liquid carbon dioxide is expanded in the nozzle V down to the triple point pressure with the resulting formation of a mixture of solid, liquid and gaseous carbon dioxide that is discharged from a nozzle V into the press chamber as a mixture of moist or wet snow and gas. The wet snow falls to the bottom of the press chamber while the gases are withdrawn through the ports 30 at such a rate in relation to the liquid discharge as to maintain the chamber pressure at the triple point during filling of the chamber with moist snow. Then, following collection of the desired amount of wet snow in the press chamber, the liquid expansion is cut off and the chamber pressure is reduced to substantially atmospheric pressure by withdrawal of the gases from the chamber with the resulting evaporation of the liquid in the moist snow mixture to solidify and form in the chamber a mass or body of solid carbon dioxide. Following this, the press plunger 11 is then actuated to press this mass or body of solid carbon dioxide into a block or cake of high density. This block or cake can then be removed by lowering platform 14, after which the above cycle of operations can be again repeated.

A continuous production apparatus or plant utilizing the press type of solidifier P hereinbefore described is diagrammatically shown in Fig. 1 of the drawing as including two of the press solidifiers P, each of which is representative of a solidifier group that may include one or any desired number of solidifiers to make up the group. The liquid receiver R is connected by the liquid supply line 31 with the high pressure stage of the compressor C, the usual condenser L being inserted in the line 31 for the purpose of liquefying the high pressure gas from compressor C by withdrawal of compression heat therefrom, as will be readily understood. Similarly, the high pressure stage of the recompressing or auxiliary compressor C' is connected with and supplies liquid carbon dioxide to the receiver R through the liquid supply line 37. A suitable condenser L' is inserted in the line 37 in order to liquefy the high compression gas from the compressor C' in the usual manner. The liquid receiver R is connected with and supplies liquid carbon dioxide to the nozzle units V of each solidifier P of the solidifier groups by the liquid supply lines 32, respectively, each of which lines has a controlling valve 33 therein by which the liquid to a nozzle V can be shut off as may be required.

Each of the discharge ports 30 of each of the press solidifiers P is connected with and discharges gas into a main or common gas line or manifold 40, and these common or main gas lines extend to and are connected and coupled at their ends by the line 41. The common gas lines 40 each have a valve 42 interposed therein adjacent the connection of each line with the gas line 41, and this connecting gas line 41 is coupled with a gas line 38 that extends to and connects with the intake or low pressure stage of the two-stage compressor C'.

A by-pass or shunt line 43 is connected at its opposite ends into communication with the main gas lines 40, respectively, between each press solidifier P and valves 42 of these gas lines 40, and valves 44 are interposed and located in the shunt line 43 adjacent the ends thereof that are respectively connected into the main gas lines 40. A gas line 34 is connected into the shunt or bridge line 43 and extends to and places line 43 in communication with the intake of the low pressure stage of the compressor C. As in this instance, this compressor C forms the main liquefying compressor, the lower stage thereof is at substantially atmospheric pressures, or but slightly thereabove, and fresh carbon dioxide gas is also supplied to the low stage of this compressor by the supply line G which is in communication and receives gas from any suitable source of supply (not shown).

In the operation of the apparatus or plant disclosed in Fig. 1, and in accordance with the method of solidification hereinbefore referred to as an example, the right-hand press solidifier P, or group of these solidifiers, is operated to form a mass of moist or wet snow in the press chambers by discharging the liquid carbon dioxide through the press nozzle valves V, while the gas offtake lines 35 and 40 are connected and coupled with the gas line 38 to the auxiliary compressor C'. This connection is made by closing right-hand valve 44 in shunt line 43 and opening valve 42 in the side of the gas line 40 directly coupled with the right-hand solidifier, while the valve 42 in the other side of the common gas line 40 is closed. In this way, the press P, or group of these presses, is being charged and filled with moist snow under a desired pressure obtained through rate of gas withdrawal by the auxiliary compressor C'. While this operation of the right-hand press group is being carried out, the left-hand press P, or group of presses, is operating to press the previously formed solid carbon dioxide in the press chambers into blocks and to discharge the same from the presses. The left-hand press or group, while pressing, is cut off from the compressors C and C' by closing the left-hand valve 44 in the shunt line 43 and the left-hand valve 42 in the common gas line 40, liquid supply valve 33 to nozzle V having also been closed, of course, to stop discharge of liquid and snow formation.

During the operation of completing the snow formation and compressing the snow into blocks for discharge from the press P at the left side of Fig. 1, the right-hand press group is charging with snow and solidifying so that by the time the left-hand press group has completed its pressing operations and has been emptied and snow formation has again started therein by expanding liquid through the nozzle and valve unit V thereof, the right-hand press group has completed its snow formation and is pressing and preparing to discharge its completed block. Thus, by alternate or successive operations of the press or solidifier group, it is possible to obtain a substantially continuous production of the solid carbon dioxide. In this manner, with the single set of compressors, or compressor, the practically continuous ice block production is made possible, while the arrangement permits independent but simultaneous press or press group operation so timed that one press or group is always in operation to produce and discharge solid carbon dioxide from the plant.

By the arrangement of the compressors C and C' and of the valves 42 and 44 in the common gas lines 40 and in the shunt line 43, the selective connection of the press solidifiers with the compressor C or C' is readily carried out. For instance, to connect, say, the right-hand press P with the compressor C', the right-hand valve 44 in the bridge line, is closed, with the right-hand valve 42 open but the left-hand valve 42 closed. Thus, the gas is withdrawn by the compressor C' through the pipe lines 35, 40, 41 and 38. Upon completion of the solidification operation that requires compressor C' to withdraw gases from the press, the valve 42 is closed and valve 42 in the shunt line 43 is then opened. This places the right-hand press P in gas withdrawing connection with the compressor C, through the gas lines 35, 40, 43 and 34. As these operations of selectively connecting a press P with either the compressor C' or the compressor C, are timed so as to be preferably carried out while the other press or press group is pressing the previously formed solid into block form, the compressors C and C' are not required for such other press or press group, and are thus solely utilized by the press group that is in the process of expanding the liquid to form and charge the press, or group, with solid carbon dioxide.

Due to the arrangement of the apparatus forming a continuous production plant in accordance with the invention which provides the solidifier groups, it is readily possible to have a centralized control point, say, intermediate the opposite solidifier groups from which an operator can carry on the general control of the solidifier group operation. For instance, by utilizing the common liquid receiver R and disposing this receiver between or intermediate the solidifier groups and by locating the major controls for the gas and liquid line valves at a centralized point intermediate the solidifier groups, a very convenient and efficient control requiring a minimum number of operators is made possible. Similarly, by grouping and arranging, the various pressure, temperature and time indicating instruments, universally employed with such types of solidification apparatus, together at the centralized control point, such instruments can be located within view of an operator at the central or localized operating control point.

It is also evident that various changes, modifications, variations, substitutions, eliminations and additions might be resorted to without departing from the spirit and the scope of my invention; hence, I do not wish to restrict my invention in all respects to the exact and specific disclosures hereof, or to the particular method described and followed in the example of apparatus and its operation of this disclosure.

What I claim is:—

1. Apparatus for continuously producing blocks of high density solid carbon dioxide comprising, a plurality of mechanical presses arranged in two groups, each of said presses including a press chamber and a liquid carbon dioxide nozzle discharging into the chamber, the press chamber of each press being provided with a gas outlet therefrom, a liquid carbon dioxide receiver, a liquid supply line from said receiver to each press group, respectively, and each supply line coupled with the press chamber nozzles of the presses of the respective group, a main carbon dioxide liquefying compressor, an auxiliary carbon dioxide liquefying compressor, said compressors in liquid supplying connection with the liquid receiver, a common gas manifold in communication with and receiving gas from the gas outlets of the presses of both press groups, a gas line from said common manifold to the gas intake of the main compressor, a gas line from the manifold to the gas intake of said auxiliary compressor, and valves arranged in said manifold and said gas lines to the compressors, respectively, for connecting the press chambers of either group of presses with either of said compressors, respectively.

2. Apparatus for continuously producing blocks of high density solid carbon dioxide comprising a plurality of mechanical presses arranged in groups, each of said presses including a press chamber and a liquid carbon dioxide nozzle discharging thereinto, the press chamber of each press being provided with a gas outlet therefrom, a liquid carbon dioxide receiver, a liquid supply line from said receiver to the press chamber nozzle of each press of the press groups, a main carbon dioxide liquefying compressor, an auxiliary liquefying compressor, said compressors in liquid supplying connection with the liquid receiver, a closed and common gas receiving line in communication with and receiving gas from the gas outlets from the press chambers of all the presses of the press groups, a gas line from said common gas line to the main compressor, a gas line from said common gas line to the auxiliary compressor, a valve in the gas line to the main compressor for each press group and so arranged as to connect the main compressor with any press group and shut off the remaining groups, and a valve in said common gas line for each press group for controlling the connection to the auxiliary compressor, said valves so arranged as to connect the auxiliary compressor with any press group and shut-off the remaining groups from the compressor.

3. Apparatus for continuously producing solid carbon dioxide including a plurality of carbon dioxide solidifiers arranged in two groups, each of said solidifiers including a solidification chamber and a gas outlet therefrom, a liquid carbon dioxide receiver, a liquid supply line from said receiver to each solidifier group, respectively, and each supply line connected with the solidification chambers of the solidifiers of the group for supplying liquid thereto, multiple-stage carbon dioxide liquefying compression means in liquid supplying connection with said liquid receiver, a common gas receiver in communication with and receiving gas from the gas outlets of the solidification chambers of both groups, a gas line from the gas receiver to a low pressure stage of said compression means, a gas line from the gas receiver to a higher pressure stage of said compression means, and valves controlling said gas lines to the said compression stages, respectively, for connecting the solidification chambers of either group of solidifiers with either of the aforesaid compression stages, respectively.

4. Apparatus for continuously producing solid carbon dioxide including, in combination, a plurality of carbon dioxide solidifiers arranged in groups, each solidifier having a carbon dioxide gas offtake and means for discharging liquid carbon dioxide thereinto, multi-stage carbon dioxide liquefying compression means coupled with and supplying liquid to the solidifiers of each group, means for selectively cutting off the supply of liquid to the solidifier groups, a common gas receiver connected with and receiving carbon dioxide gas from the gas offtakes of the solidifiers of the groups, a gas line from said gas receiver to one stage of said compression means, a separate gas line from said gas receiver to another stage of said compression means, and means controlling said gas receiver and gas lines for connecting the solidifiers of either group with either of the aforesaid stages of said liquefying compression means.

5. Apparatus for continuous production of solid carbon dioxide including, in combination, a plurality of carbon dioxide solidifiers arranged in groups, separate carbon dioxide liquefying means in liquid supplying connection with the solidifiers of each group, each solidifier having a gas offtake therefrom, a common gas receiver for all the groups connected with and receiving gas from the gas offtakes of the solidifiers of each group, separate gas lines from the common gas receiver to said separate liquefying means, respectively, and control means in said gas lines for selectively connecting any solidifier group with said liquefying means, and for selectively connecting such solidifier group with either of said liquefying means.

6. Apparatus for continuous production of solid carbon dioxide including, in combination, separate groups of carbon dioxide solidifiers each comprising a plurality of such solidifiers, carbon dioxide liquefying means common to the solidifier groups for supplying liquid carbon dioxide to the solidifiers thereof for solidification, gas offtake means from the solidifiers of each group to said liquefying means, and control means for selectively connecting the gas offtake means for one of said solidifier groups in gas withdrawing relation with said liquefying means and for shutting off the gas offtake means of the other solidifier groups from said liquefying means.

7. Apparatus for substantially continuous production of solid carbon dioxide, including, in combination, a plurality of carbon dioxide solidifiers arranged in two groups, multi-stage carbon dioxide liquefying compression means for supplying liquid carbon dioxide to the solidifiers of each group, each solidifier having a carbon dioxide gas offtake therefrom, a common gas receiver for both groups connected with and receiving gas from the gas offtakes of the solidifiers of the groups, separate gas lines from the common gas receiver to different stages, respectively, of said multi-stage compression means, control means in said gas lines for connecting either solidifier group with said compression means and for selectively connecting such group with the desired stage of the said multi-stage compression means.

8. Apparatus for substantially continuously producing blocks of solid carbon dioxide comprising a plurality of mechanical presses each having a press chamber, a liquid carbon dioxide expanding valve and discharge nozzle unit for each press discharging into the press chamber thereof, the press chamber of each press being provided with a gas outlet therefrom, a main carbon dioxide compressor, an auxiliary carbon dioxide compressor, liquid carbon dioxide supply lines from said main and auxiliary compressors to the valve and nozzle units of the presses, said lines including compressed gas liquefying means, a gas manifold, a gas line from the gas outlet of each press chamber to said manifold, a shut-off valve in each of said gas lines to the manifold, a gas line from said manifold to the low pressure intake of said auxiliary compressor, a separate gas line around said manifold from said press outlet gas lines and in advance of the shut-off valves in said lines, a shut-off valve in said separate gas line at each point of connection thereof with a press outlet gas line, respectively, and a gas line from said separate gas line to the intake of said main compressor.

THEOPHIL EICHMANN.